Dec. 17, 1963  G. H. BOUCHARD  3,114,853
ENCAPSULATED ELECTROLUMINESCENT DEVICE
Filed Aug. 24, 1960
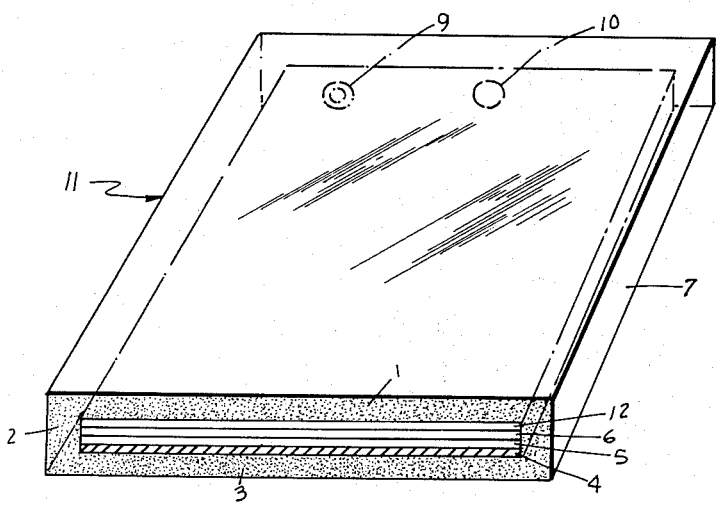
GEORGE H. BOUCHARD
*INVENTOR.*
BY *Owen J. Meegan*
ATTORNEY

United States Patent Office 3,114,853
Patented Dec. 17, 1963

3,114,853
ENCAPSULATED ELECTROLUMINESCENT
DEVICE
George H. Bouchard, Ipswich, Mass., assignor to Sylvania
Electric Products Inc., a corporation of Delaware
Filed Aug. 24, 1960, Ser. No. 51,554
5 Claims. (Cl. 313—108)

This invention relates to an electroluminescent device which is impervious to the effects of humidity. More specifically, this invention relates to the encapsulation of an electroluminescent device with a transparent organic resin bonded to said device over its light-transmitting electrode.

An electroluminescent device is generally constructed of a base plate member which serves as the first electrode and also imparts stability to the lamp. This electrode may be prepared of electrically conductive glass, a metal plate or an electrically conductive plastic. The second electrode of the lamp is prepared of a light-transmitting conductive coating. One known method of preparing this coating is by spraying a phosphor-coated first electrode while hot with a solution consisting substantially of a metallic compound, for example chlorides or less commonly oxides, sulphates or organic complexes. Alternatively, this process of applying the conductive coating to the device may be carried out, for example, by heating the glass plate and exposing it while hot to the vapors of the chlorides of metals such as tin, antimony or indium and afterward placing the treated device in a slightly reducing atmosphere. When the application of the conductive coating in a vapor state or by spraying is not convenient, good results can be obtained by mixing stannic chloride with absolute alcohol and acetic acid and dipping the heated glass into the boiling mixture. A layer of light-producing material including an electroluminescent phosphor, for example electroluminescently-activated zinc sulfide, is provided between the first and second electrodes. The structure and preparation of the lamp is shown in greater detail in the U.S. Patent to Payne, No. 2,838,715.

It is general practice in the electroluminescent lamp art to cover the light-transmitting second electrode with a layer of a glass frit. The glass frit is then fired in an oven at about 1250° F. until the frit melts and distributes itself over the entire lamp, with a humidity sealing glass coating. It is obvious that the firing temperature can vary with the time of the firing cycle. It is also obvious that many types of glass frits can be used, depending upon the desired end product.

While the purpose and intent of this glass coating is to form a seal for humidity, certain difficulties can arise in its use. For example, even minute quantities of combustible foreign particles present in the frit will burn out in the firing steps and leave pores in the glass coating. These pores are essentially holes and may allow destruction of the phosphor coating by electrolysis in the presence of high humidity in the area of the pore. This destruction will gradually expand from the area of the pore and finally render the lamp inoperative. In order to solve this problem, it has been general practice to coat at least two coatings of the glass frit over the lamp. Between each of the coating steps the lamp is fired and the glass fused, thus minimizing the likelihood of the pores lining up. By placing a very light first coat and a very heavy second coat, a protective coating will be produced which will withstand many hours of operation under high humidity conditions. This method of coating is expensive, however, due to the necessity of the double coating and the double firing. It is difficult to control in production and troublesome results are not always apparent in the newly finished product but may develop in the hands of the consumer. Some of these troubles are, for example, cracking and crazing of the glass, causing hairline cracks which will allow humidity penetration. The fusing of the glass requires firing at elevated temperatures which are sufficiently high to reduce the efficiency of the phosphor.

Other methods of controlling the effects of humidity have been attempted. For example, it is disclosed in my copending application, Serial No. 478,611, filed December 30, 1954, now Pat. No. 3,070,722, of which this application forms a continuation-in-part, that the lamp may be placed into a pocket of two plastic sheets and the edges of these plastic sheets sealed. There is no intention, in my prior application however, to bond the transparent resin to the device over the light-transmitting electrode. This edge sealing will effectively eliminate the humidity; however, the finished lamp is difficult to produce because of high production costs. Furthermore, by bonding the plastic to the lamp as taught by the instant invention, a much more stable lamp is produced which may withstand even sharp and heavy impact.

The placing of a plastic covering around an object sought to be protected is well known in the art. For example, it is known to edge-seal enveloping plastic covers of pictures or documents thereby giving an article which will not be effected by handling. The use of a plastic layer in combination with an electroluminescent lamp is also known to the art, such as is shown in the patent to Burns, No. 2,755,406. The plastic covering in that lamp, however, is used as a means for retaining a compacted phosphor. It does not extend over the light-emitting lamp face and does not form a humidity-proof seal.

According to this invention it has been discovered, however, that an electroluminescent device can be permanently sealed from the effects of humidity, and the glaze coatings formerly thought to be a pre-requisite may be eliminated. Encapsulation is the covering of the electroluminescent device with a protective layer of light-transmitting plastic which is bonded to the device over the light-transmitting second electrode face. A solventless, pourable resin or plastic which has low viscosity at room temperature is suitable for the pinhole free encapsulation media. Although the curing may be effected by a heat treatment, it is possible to cure by allowing the plastic to set overnight at room temperature. The encapsulating plastic may be applied to the lamp by dipping, spraying, molding or spreader coating as desired. These methods will produce an effective bond of the plastic to the lamp and heat sealing of edges is eliminated.

It is an object of this invention to produce an electroluminescent device which is impervious to the effects of humidity by the bonded encapsulation of the device in a transparent plastic.

It is a further object of this invention to produce a durable and stable device by bonding a layer of a transparent plastic thereto.

A feature of this invention is that the protective glass coatings over the second electrode, previously thought essential for a humidity-proof lamp, may be omitted if desired.

Other objects, features and advantages will become apparent to those skilled in the art upon reading the following specifications when taken in connection with the accompanying drawing.

Referring now to the drawing the FIGURE is illustrative of an encapsulated electroluminescent lamp. The lamp comprises the first electrode 4, which may be prepared of a metal plate, a conductive glass, or a conductive plastic. In the case of the use of a metal plate as the first electrode, it is general practice to place an electrically conductive ground coat 5 thereover. This ground coat 5 will serve as a base for the layer of light-emitting material including the electroluminescent phosphor 6. Over the layer of phosphor 6 is a layer of a light-transmitting conductive film 12 which will serve as a second electrode for the lamp, which may be a suitable metal compound, for example stannous oxide. The electrical contact elements 9 and 10 are secured to the first and second electrodes respectively. The contact 9 which may be in the form of a grommet conductor is insulated from the second electrode 12 and in electrical conducting relation with the first electrode 4. The second electrode 10 is in electrical conducting relation with the second electrode 12 and insulated from the first electrode 4.

The transparent plastic resin is bonded to the electroluminescent lamp, at least on the sides 7 and over the light-transmitting face of the second electrode 12. If desired, however, the lamp may be entirely encapsulated; that is, having the plastic bonded to all of the surfaces of the lamp. Irrespective of the type of encapsulation used, the lamp will be entirely humidity proofed. The thickness of the encapsulating plastic should be determined by the intended use of the lamp and the conditions to which it will be subjected. If an encapsulated device is desired that is extremely stable the heavy and sharp impact, an electroluminescent device about 1/16 inch thick is bonded with 1/8 inch of plastic on either side. It is possible, however, to use plastic thicknesses of less than about 1/16 inch. This type of encapsulated lamp is durable enough to withstand the weight of an automobile and may be used for example as an illuminated center strip on a highway.

In the practice of this invention, a metal base plate is coated with a ground coat of electrically conductive glass, the combination of which is fired, thus fusing the glass, which serves to form a first electrode. The electroluminescent phosphor admixed with a low fusing temperature glass is then coated over the ground coat. This phosphor is then fired and thus fused to the surface of the ground coat. After this firing step the device is coated with material which will form the light-transmitting second electrode. The lamp is fired again and the second electrode thus fused to the phosphor coat. The exposed metal surfaces around the periphery of the lamp are decoated of the second electrode to prevent short circuiting and it is ready for encapsulation. In the case of molding techniques, it is mounted in a tray to give a spacing of about 0.060 inch to allow a coat of about 1/16 inch over the base of the device. If the tray is used, a polished steel plate or some other suitable polished metal plate is placed at the bottom thereof, which will give the plastic base of the lamp a polished surface. The tray is then placed in a vacuum chamber. The resin and accelerator are weighed out and mixed in a suitable container. The fluid resin is then placed in a vacuum chamber wherein the pressure is decreased, thus causing the air bubbles that are entrapped in the resin to rise to the surface and be eliminated. When the resin in the container has been completely freed of air bubbles, it is poured into the molding tray so that it will completely surround the electroluminescent device. Air is allowed to enter the vacuum chamber so that ambient conditions are resumed. The tray is removed, the lamp is centered and is placed in an oven to gel at about 150° F. When the gelling starts, which is usually about one hour, the lamp is removed from the mold while it is still in a rubbery state and polymerization is allowed to continue at room temperature to the final cure. An encapsulated device is produced which is entirely free of pinholes or similar defects.

While this method of making plastic encapsulated lamps is now in use, it is obvious that those skilled in the art may devise many other methods of forming the encapsulation. For example, it is possible to use a rotary method of lamp encapsulation which would involve automatic dispensing and pouring equipment which would produce bubble-free coating. The molds can be made to travel in a vertical position and can be filled from the bottom to the top. To fill the mold it can be first evacuated. If air is allowed to enter into the mixing chamber, the resin will run into the mold and it will be completely filled. The filling part of the mold is enclosed and the unit is heated until the resin has gelled. The mold is then opened and encapsulated lamp ejected. The lamp is then allowed to finish the cure at room temperature. It is also possible to use a spreader coating technique or dipping technique in the encapsulation, if desired.

In order to prepare an encapsulated electroluminescent lamp the plastic should be transparent. It should have good flexibility, and should not damage the lamp but should be inert thereto. It should act as a barrier between the humidity and the atmosphere and the electroluminescent lamp. It is apparent that the depth of the coating may be varied within wide limits. At the lower limit, it is essential that the entire lamp be at least coated in such a depth that the humidity will not penetrate it. At the upper limit, the light emitted from the lamp must still be visible. It may be good practice to also seal the leads to the several electrodes with the encapsulating transparent plastic resin since these very often serve as means to admit humidity to the lamp.

The resins that we have found particularly useful have been the epoxies, since they are transparent, have good flexibility and gel rather quickly; that is, in less than one hour at 150° F.

It is apparent, however, that many other resins are suitable for use as the transparent encapsulating plastic. For example, in the class of thermosetting resins there are transparent coatings such as allyl casting resins, phenolic casting resins, epoxy casting resins, glycerylphthalate casting resins and polyester casting resins.

In the field of opaque thermosetting resins, there are diallyl phthalate molding resins, epoxy molding resins, furan molding resins, melamine-formaldehyde molding resins, polyester molding resins, polyacrylate molding resins and ureaformaldehyde molding resins. In the field of thermoplastic resins there are transparent resins such as methylmethacrylate or cellulose-nitrate, ethylcellulose acetate, cellulose propionate, cellulose acetate butyrate, or polychlorotrifluoroethylene.

Also suitable for use are vinyl alcohol molding resins, vinyl butyral and vinyl chloride molding resins. Furthermore, it has been found that opaque resins may be used such as nylon, polyethylene molding resins, polypropylene molding resins, or chlorinated polyether molding resins. Depending upon the desired use of the lamp and the conditions to which it will be subjected to in use, the proper selection of these resins or combinations thereof should be made.

The method of fabrication of the lamp will depend in a large degree upon the particular resin desired to be used in the given encapsulated lamp. Variations essential in effecting the cure of the different resins, such as the curing time or even raising the curing temperature will not effect the quality of the lamp.

It is apparent that other changes may be made by those skilled in the art without departing from the scope of this invention.

As my invention I claim:

1. An electroluminescent device adapted to be subjected to high impact comprising a first electrode selected from the group consisting of a metal sheet and glass which has been rendered electrically conductive, a second electrode, a layer of light-producing material including an electroluminescent phosphor between said first electrode and said second electrode, means to conduct electricity to said first electrode, means to conduct electricity to said second electrode, at least one of said electrodes being light-transmitting, means to encapsulate said electroluminescent device comprising a transparent organic resin bonded to said device over said light-transmitting electrode.

2. An electroluminescent device adapted to be subjected to high impact comprising a first electrode selected from the group consisting of a metal sheet and glass which has been rendered electrically conductive, a second electrode, a layer of light-producing material between said first and second electrodes, at least one of said electrodes being light-transmitting, means to conduct electricity to each of said first and second electrodes, means to encapsulate said electroluminescent device comprising a layer of transparent organic resin bonded to said device over said light-transmitting electrode.

3. An electroluminescent device adapted to be subjected to high impact comprising a first electrode selected from the group consisting of a metal sheet and glass which has been rendered electrically conductive, a second electrode, a layer of light-producing material including an electroluminescent phosphor between said first and second electrodes at least one of said electrodes being light-transmitting, means bonded to said device to encapsulate said electroluminescent device including a transparent organic resin, whereby the electroluminescent device is rendered impervious to the effects of humidity.

4. An electroluminescent device adapted to be subjected to high impact having a light-emitting face comprising a first electrode selected from the group consisting of a metal sheet and glass which has been rendered electrically conductive, a second electrode, a layer of light-producing material including an electroluminescent phosphor between said first electrode and said second electrode, at least the electrode of the light-emitting face being light-transmitting, means to conduct electricity to each of said first and second electrodes, an encapsulating layer of transparent plastic resin bonded to said device over said light-emitting face to seal the device from the effects of humidity.

5. An electroluminescent device adapted to be subjected to high impact comprising a first electrode selected from the group consisting of a metal sheet and glass which has been rendered electrically conductive, a second electrode, a layer of light-producing material including an electroluminescent phosphor between said first electrode and said second electrode, at least one of said electrodes being light-transmitting, means to conduct electricity to each of said first and second electrodes, means bonded to said device over said light-transmitting electrode to encapsulate said electroluminescent device in a layer of transparent organic resin.

References Cited in the file of this patent

UNITED STATES PATENTS

| | | |
|---|---|---|
| 2,222,788 | Touceda et al. | Nov. 26, 1940 |
| 2,866,117 | Walker et al. | Dec. 23, 1958 |
| 2,944,177 | Piper | July 5, 1960 |
| 2,964,666 | Klasens et al. | Dec. 13, 1960 |
| 2,988,661 | Goodman | June 13, 1961 |
| 3,007,070 | Cargill | Oct. 31, 1961 |
| 3,064,155 | Bell | Nov. 13, 1962 |